(12) United States Patent
Taki

(10) Patent No.: US 12,478,344 B2
(45) Date of Patent: Nov. 25, 2025

(54) RADIATION IMAGE PROCESSING APPARATUS, OPERATION METHOD OF RADIATION IMAGE PROCESSING APPARATUS, AND NON-TRANSITORY COMPUTER READABLE MEDIUM

(71) Applicant: FUJIFILM Corporation, Tokyo (JP)

(72) Inventor: Tomoko Taki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 328 days.

(21) Appl. No.: 18/467,138

(22) Filed: Sep. 14, 2023

(65) Prior Publication Data

US 2024/0090861 A1 Mar. 21, 2024

(30) Foreign Application Priority Data

Sep. 15, 2022 (JP) ................. 2022-147440

(51) Int. Cl.
| | | |
|---|---|---|
| *A61B 6/00* | (2024.01) | |
| *A61B 5/00* | (2006.01) | |
| *A61B 6/46* | (2024.01) | |
| *A61B 6/50* | (2024.01) | |

(52) U.S. Cl.
CPC .......... *A61B 6/5217* (2013.01); *A61B 5/4872* (2013.01); *A61B 6/461* (2013.01); *A61B 6/482* (2013.01); *A61B 6/505* (2013.01); *A61B 6/5241* (2013.01); *A61B 6/5258* (2013.01)

(58) Field of Classification Search
CPC ..... A61B 6/5217; A61B 5/4872; A61B 6/461; A61B 6/482; A61B 6/505; A61B 6/5241; A61B 6/5258; A61B 6/5282
See application file for complete search history.

(56) References Cited

U.S. PATENT DOCUMENTS

| | | | | |
|---|---|---|---|---|
| 5,020,085 A | * | 5/1991 | Kawara ................ | A61B 6/4035 378/146 |
| 2014/0219423 A1 | * | 8/2014 | Bertens ................. | A61B 6/032 378/62 |
| 2018/0263559 A1 | * | 9/2018 | Kawamura ............ | A61B 6/032 |

FOREIGN PATENT DOCUMENTS

JP 2015-019789 A 2/2015

* cited by examiner

*Primary Examiner* — Courtney D Thomas
(74) *Attorney, Agent, or Firm* — Studebaker Brackett PLLC

(57) ABSTRACT

A radiation image processing apparatus according to an embodiment of the present invention acquires at least two radiation images in which a plurality of radiation energies different from each other are used, respectively, for the same subject, calculates a fat percentage occupied in a soft tissue of the subject by subtraction processing with respect to the two radiation images, and applies the fat percentage to the subtraction processing with respect to another image that is a radiation image in which the subject is imaged at a different timing.

15 Claims, 10 Drawing Sheets

RADIATION IMAGE PROCESSING APPARATUS, OPERATION METHOD OF RADIATION IMAGE PROCESSING APPARATUS, AND NON-TRANSITORY COMPUTER READABLE MEDIUM

CROSS-REFERENCE TO RELATED APPLICATIONS

This application claims priority under 35 U.S.C § 119(a) to Japanese Patent Application No. 2022-147440 filed on 15 Sep. 2022. The above application is hereby expressly incorporated by reference, in its entirety, into the present application.

BACKGROUND OF THE INVENTION

1. Field of the Invention

The present invention relates to a radiation image processing apparatus, an operation method of a radiation image processing apparatus, and a non-transitory computer readable medium that provide an energy subtraction function.

2. Description of the Related Art

In the medical field, in a case of radiography in which a subject is imaged by using radiation, such as X-rays, a bone part image and a soft part image can be generated by acquiring two images having different X-ray energies from the same imaging part, and executing energy subtraction processing of calculating a difference thereof by using a difference in the X-ray energy characteristics between a bone part and a soft part. As a result, for example, a value reflecting a bone mass can be obtained from a pixel value of the created bone part image.

A dual x-ray absorptiometry (DXA) method is known as one typical bone mineral quantification method used for diagnosis of a bone density in an osseous system disease, such as osteoporosis. The DXA method is a method of calculating the bone density from the pixel value of the radiation image obtained by performing imaging using radiation of two types of energies by using the fact that radiation incident on and transmitted through a human body is attenuated by an attenuation coefficient ($cm^2/g$), a density ($g/cm^3$), and a thickness t(cm), which depend on a substance (for example, a bone) that constitutes the human body. In addition, various methods of evaluating the bone density by using the radiation image acquired by imaging the subject are known.

Specifically, in JP2015-019789A, a bone part image in which a bone part of a subject is extracted is generated from a plurality of radiation images acquired by radiation that is transmitted through the subject and has different energy distributions, a concentration of a region in which a bone is not present in the radiation image is calculated as a correction value indicating a fat mass, and a pixel value of the bone part image is corrected by the correction value. As a result, a method of calculating a concentration of a bone region and the bone density with higher accuracy is proposed.

SUMMARY OF THE INVENTION

However, in JP2015-019789A, since energy subtraction processing requires a longer time than normal image processing, it is necessary to wait for the energy subtraction processing to be terminated for next imaging. In addition, in many cases, set imaging is performed in a plurality of directions, such as a frontal view, a side view, and an oblique view, and a technician wants to change positioning of a patient and captures an image one after another without making the patient wait.

The present invention is to provide a radiation image processing apparatus, an operation method of a radiation image processing apparatus, and a non-transitory computer readable medium which can, in set imaging of the same person, shorten the time of total energy subtraction processing, and to improve and stabilize the accuracy of obtaining ratios of muscle and fat.

An aspect of the present invention relates to a radiation image processing apparatus comprising a processor, in which the processor acquires at least two radiation images in which a plurality of radiation energies different from each other are used, respectively, for the same subject, calculates a fat percentage occupied in a soft tissue of the subject by subtraction processing with respect to the two radiation images, and applies the fat percentage to the subtraction processing with respect to another image that is a radiation image in which the subject is imaged at a different timing from the radiation image.

It is preferable to estimate and remove scattered rays according to a body thickness distribution for each pixel for the radiation image for which the subtraction processing is performed.

It is preferable to acquire, as the other image, a different-direction image in which the subject is imaged in a different direction from the radiation image.

It is preferable to correct a bone density of the subject, which is calculated from a bone part image of the radiation image extracted by the subtraction processing, by using the fat percentage.

It is preferable to transform the fat percentage into a body thickness of a standard soft part, and to calculate a correction coefficient in calculation of the bone density of the subject from the body thickness of the standard soft part.

It is preferable to calculate the fat percentage from an entire image of the radiation image.

It is preferable to extract a soft part image in the radiation image by the subtraction processing, to derive a muscle thickness and a fat thickness of the subject from the soft part image, and to calculate the fat percentage based on the fat thickness and the muscle thickness.

It is preferable to derive the fat percentage of the radiation image that is first captured among the radiation images that are continuously captured, and to apply the fat percentage to the subtraction processing with respect to the radiation image captured thereafter.

It is preferable to apply the fat percentage to the subtraction processing with respect to a radiation video.

It is preferable to apply a fat percentage average, which is an average of two or more fat percentages calculated from the radiation images in which the subject is imaged at different timings, to the subtraction processing with respect to the radiation image.

It is preferable to calculate the fat percentage average from the fat percentages of the radiation images captured in any two types of directions different from each other among a frontal view, a side view, and an oblique view.

It is preferable to calculate the fat percentage average from the fat percentages of the radiation images captured in three or more types of directions different from each other among a frontal view, two types of side views, and a plurality of oblique views.

It is preferable to use a muscle percentage occupied in the soft tissue of the subject instead of the fat percentage.

Another aspect of the present invention relates to an operation method of a radiation image processing apparatus, the method comprising a step of acquiring at least two radiation images in which a plurality of radiation energies different from each other are used, respectively, for the same subject, a step of calculating a fat percentage occupied in a soft tissue of the subject by subtraction processing with respect to the two radiation images, and a step of applying the fat percentage to the subtraction processing with respect to another image that is a radiation image in which the subject is imaged at a different timing from the radiation image.

Still another aspect of the present invention relates to a non-transitory computer readable medium for storing a computer-executable program for causing a computer to execute a function of acquiring at least two radiation images in which a plurality of radiation energies different from each other are used, respectively, for the same subject, a function of calculating a fat percentage occupied in a soft tissue of the subject by subtraction processing with respect to the two radiation images, and a function of applying the fat percentage to the subtraction processing with respect to another image that is a radiation image in which the subject is imaged at a different timing from the radiation image.

According to the aspects of the present invention, in the set imaging of the same person, it is possible to shorten the time of the total subtraction processing, and to improve and stabilize the accuracy of obtaining the ratios of the muscle and the fat.

DESCRIPTION OF THE PREFERRED EMBODIMENTS

First Embodiment

An example of a basic configuration of the present invention will be described. A radiation image processing apparatus according to an embodiment of the present invention is a computer, such as a personal computer or a workstation in which an application program for realizing a predetermined function is installed. The computer comprises a central processing unit (CPU) which is a processor, a memory, a storage, and the like, and realizes various functions by a program or the like stored in the storage. Hereinafter, the embodiment of the present disclosure will be described with reference to the drawings.

Figure 1:
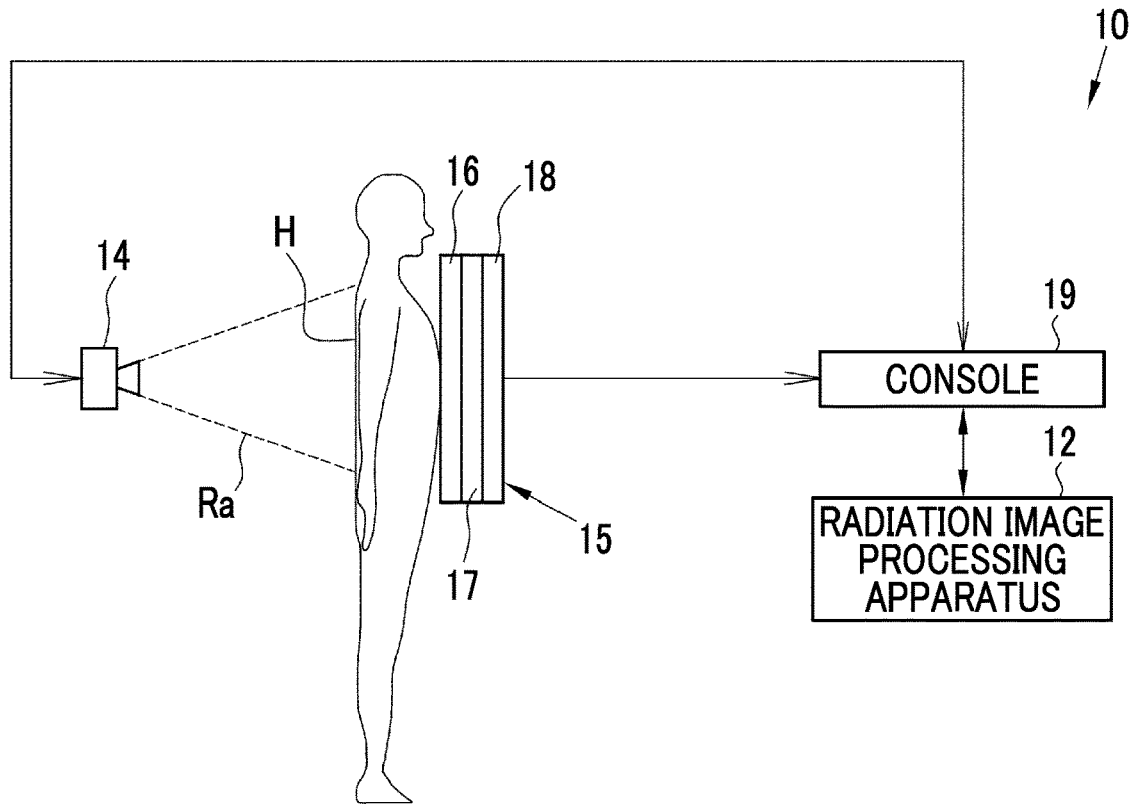
FIG. 1 is an explanatory diagram showing an outline of a radiation image processing system.

FIG. 1 is a diagram showing an outline of a radiation image processing system 10 including a radiography apparatus 11 (see FIG. 2) and a radiation image processing apparatus 12. The radiation image processing system 10 according to the present embodiment includes the radiography apparatus 11 and the radiation image processing apparatus 12. The radiography apparatus 11 and the radiation image processing apparatus 12 are electrically connected to each other so that data can be transmitted and received.

The radiography apparatus 11 comprises a radiation source 14, a radiography panel 15, and a console 19, and the radiation source 14 and the radiography panel 15 are electrically connected to the console 19. In the radiography panel 15, a first radiation detector 16, a radiation energy transformation filter 17 consisting of a copper plate or the like, and a second radiation detector 18 are disposed in this order from a side closest to the radiation source 14.

The radiography apparatus 11 irradiates the first radiation detector 16 and the second radiation detector 18 in the radiography panel 15 with radiation Ra, such as X-rays, that is emitted by driving the radiation source 14 and is transmitted through a subject H. Since a low energy component of the radiation Ra is absorbed by the radiation energy transformation filter 17, the energy of the radiation Ra is changed after being transmitted through the first radiation detector 16 and before reaching the second radiation detector 18. Since the first radiation detector 16 and the second radiation detector 18 are irradiated with different energies, the radiography apparatus 11 is an imaging apparatus for performing energy subtraction by a so-called one-shot method of acquiring two radiation images having different energies of the radiation Ra in one imaging. It should be noted that the first and second radiation detectors 16 and 18 are closely attached to the radiation energy transformation filter 17.

A first radiation image G1 of the subject H according to low energy radiation also including so-called soft rays is acquired by the first radiation detector 16. Also, a second radiation image G2 of the subject H according to high energy radiation from which the soft rays are removed is acquired by the second radiation detector 18. The first and second radiation images G1 and G2 are input to the radiation image processing apparatus 12.

The first and second radiation detectors 16 and 18 can perform recording and reading-out of the radiation image repeatedly. A so-called direct-type radiation detector that directly receives emission of the radiation Ra and generates an electric charge may be used, or a so-called indirect-type radiation detector that transforms the radiation Ra into visible light and then transforms the visible light into an electric charge signal may be used. In addition, as a method of reading out a radiation image signal, it is desirable to use a so-called thin film transistor (TFT) readout method of reading out the radiation image signal by turning a TFT switch on and off, or a so-called optical readout method of reading out the radiation image signal by emission of read out light. However, other methods may also be used without being limited to these methods.

Figure 2:
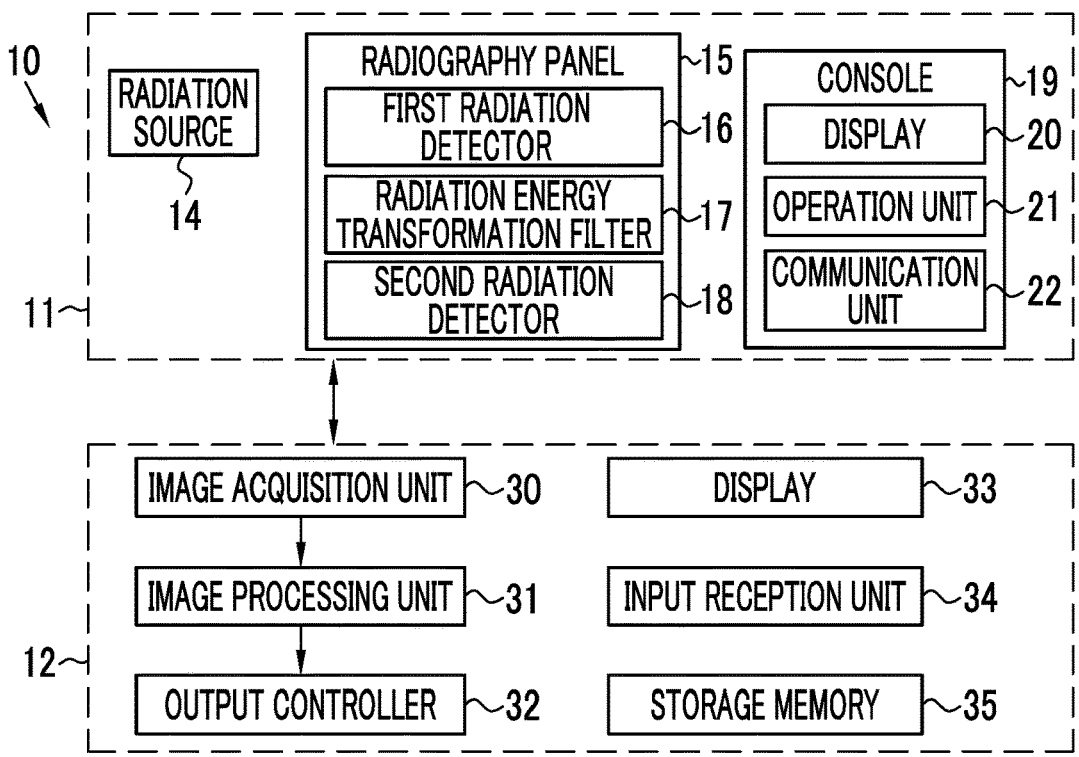
FIG. 2 is a block diagram showing functions of a radiography apparatus and a radiation image processing apparatus.

FIG. 2 is a block diagram showing a functional configuration of the radiation image processing system 10 according to the present embodiment. The console 19 comprises a display 20, an operation unit 21, and a communication unit 22. The radiation image processing apparatus 12 according to the present invention comprises an image acquisition unit 30, an image processing unit 31, an output controller 32, a display 33, an input reception unit 34, and a storage memory 35.

The radiography apparatus 11 acquires at least two radiation images of the same subject H by using energy subtraction imaging using two types of radiation energies different from each other. The radiation images in which the energy distributions (hereinafter, energies) of the radiation Ra are different are distinguished as an image having a low energy and an image having a high energy among the two radiation images. Since the radiation image having the low energy has a clear contrast between a bone and a soft tissue, it is preferable to perform the extraction of a bone part image Gb, which will be described below, from the radiation image having the low energy in the energy subtraction processing. An imaging condition need only be set by the input of an operator from the operation unit 21. It should be noted that the same subject H means the same person in the two first and second radiation images G1 and G2, which are captured, and the subject having a common imaging part.

The imaging using the two types of radiation energies different from each other means that the radiation qualities (energies) of the radiation Ra are substantially different from each other in a case in which the formation of the radiation image or the detection of the radiation Ra is performed at least twice, the radiation qualities of the radiation Ra detected by the first radiation detector 16 and the radiation Ra detected by the second radiation detector 18 via the radiation energy transformation filter 17 are the two types of radiation energies different from each other. As a result, the two obtained radiation images are the radiation images using radiation energies different from each other.

The first radiation image G1 acquired from the first radiation detector 16 uses a lower energy for generating the radiation image than the second radiation image G2 acquired from the second radiation detector 18. It should be noted that, in a case in which the radiation image is acquired in which the same subject is imaged by using three or more types of a plurality of radiation energies different from each other, respectively, two radiation images of a plurality of three or more radiation images different from each other are selected, the radiation image having the low energy is used as the first radiation image G1, and the other thereof is used as the second radiation image G2.

Figure 3:
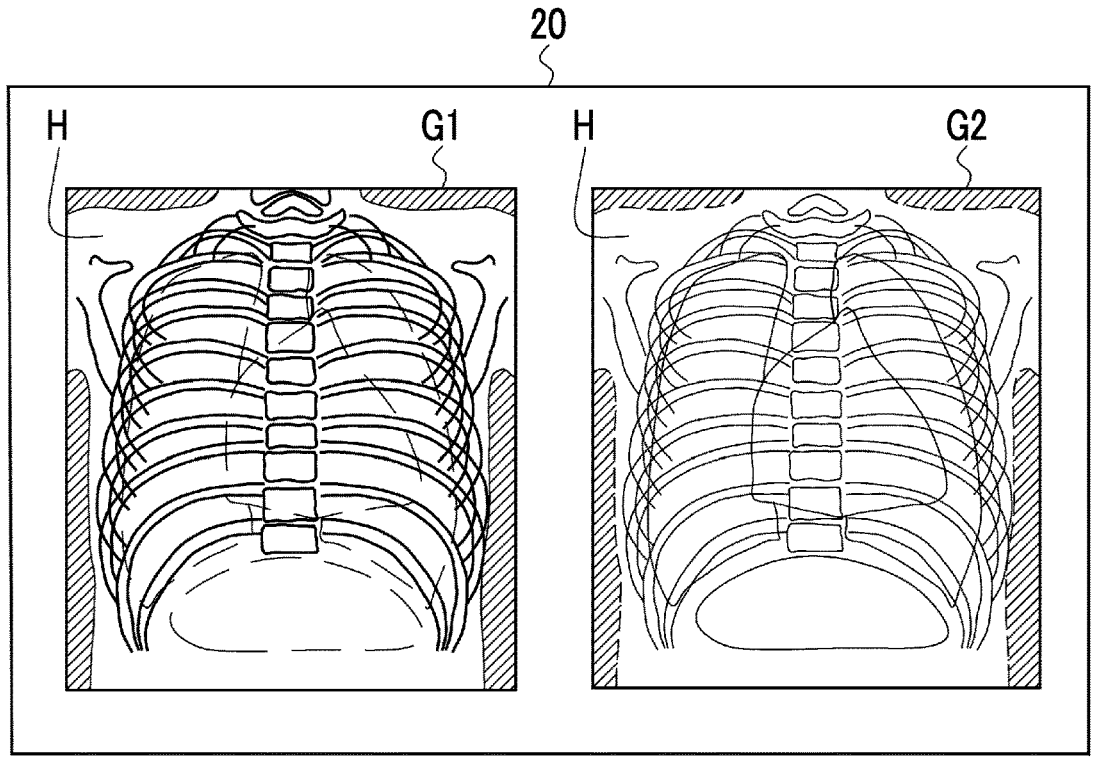
FIG. 3 is an explanatory diagram of two radiation images captured using radiation energies different from each other.

As shown in FIG. 3, the captured first and second radiation images G1 and G2 can be checked on the display 20 of the console 19. The first and second radiation images G1 and G2 are the radiation images in which a frontal view of the chest of the subject H is captured. An imaging person checks a display content of the display 20, operates the operation unit 21 in a case in which there is no problem, and transmits the first and second radiation images G1 and G2 from the communication unit 22 to the radiation image processing apparatus 12. It should be noted that, in a case of performing re-imaging or performing the imaging a plurality of times, the operator need only input an instruction from the operation unit 21.

In the radiation image processing apparatus 12, the CPU functions as the image acquisition unit 30, the image processing unit 31, the output controller 32, and the input reception unit 34 by executing a radiation image processing program. The image acquisition unit 30 acquires the first radiation image G1 and the second radiation image G2 from the radiography apparatus 11. The image processing unit 31 performs the extraction of the bone part image or a soft part image from the first radiation image G1 and the second radiation image G2, the derivation of a fat percentage, the derivation of a bone density by using the fat percentage, and the like. The output controller 32 controls displaying of each of the acquired images and the derived data on the display 33, the transmission thereof to the storage memory 35 or an external server, and the like.

The display 33 is a display device that displays the radiation image acquired by the radiation image processing apparatus 12. The input reception unit 34 receives the input to the radiation image processing apparatus 12 by an input device, such as a keyboard or a mouse. The connection of the display 33 or the input device is not limited to providing in the radiation image processing apparatus 12 or the direct connection, and may be the connection via various networks. Therefore, in the radiation image processing apparatus 12, the display 33 or the input device may be located at a position distant from the computer constituting the radiation image processing apparatus 12. The storage memory 35 transitorily stores data used for image processing or the like, or stores the acquired images or values.

The image acquisition unit 30 acquires the first and second radiation images G1 and G2 from the radiography apparatus 11. It is preferable that the two first and second radiation images G1 and G2, which are acquired, are so-called original images (images that are not subjected to the image processing or the like).

The first radiation image G1 and the second radiation image G2, which are acquired, are associated with settings of the imaging conditions, such as an imaging dose (mAs value), the radiation quality, the tube voltage, a source image receptor distance (SID), which is a distance between the radiation source 14 and the surfaces of the first and second radiation detectors 16 and 18, a source object distance (SOD), which is a distance between the radiation source 14 and the surface of the subject H, and the presence or absence of the scattered ray removal grid, as image information. The SOD and the SID are used to calculate a body thickness distribution. It is preferable to acquire the SOD by, for example, a time of flight (TOF) camera. It is preferable to acquire the SID by, for example, a potentiometer, an ultrasound range finder, a laser range finder, or the like.

It is preferable to obtain the body thickness distribution by subtracting the SOD from the SID. The body thickness distribution is calculated for each pixel corresponding to the first and second radiation images G1 and G2. In addition, a method of calculating the body thickness distribution from at least one of the first radiation image G1 or the second radiation image G2, or a method of calculating the body thickness distribution from the soft part image of the subject H, which will be described below, may be used. The body thickness distribution excluding an influence of a scattered ray component can be obtained by scattered ray removal processing which will be described below.

Figure 4:
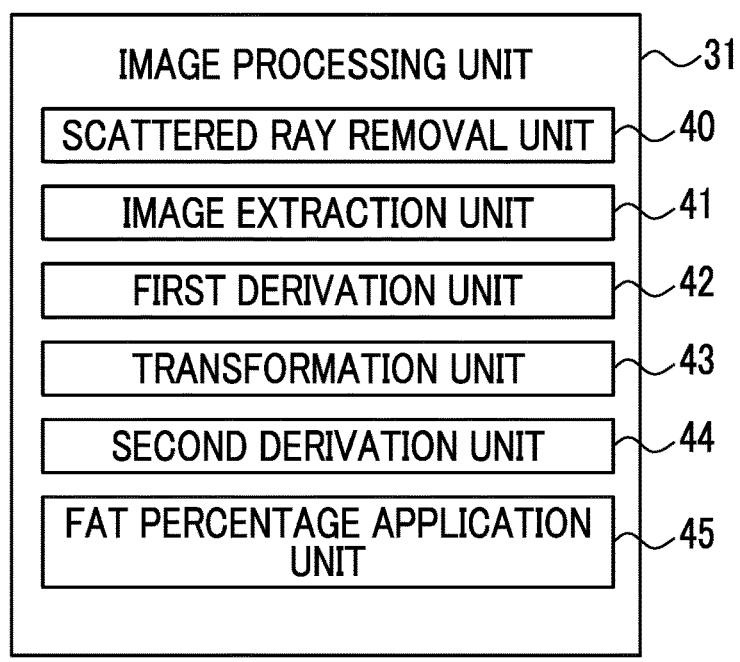
FIG. 4 is a block diagram showing a function realized by an image processing unit in the radiation image processing apparatus.

FIG. 4 is a diagram showing a functional configuration of the image processing unit 31 of the radiation image processing apparatus 12. The image processing unit 31 further realizes functions of a scattered ray removal unit 40, an image extraction unit 41, a first derivation unit 42, a transformation unit 43, a second derivation unit 44, and a fat percentage application unit 45. The scattered ray removal unit 40 removes scattered rays of the first and second radiation images G1 and G2 based on the estimated or measured body thickness distribution. The image extraction unit 41 extracts the bone part image and the soft part image from the first and second radiation images G1 and G2 from which the scattered rays are removed. The first derivation unit 42 derives a fat percentage Rf of the subject H. The transformation unit 43 transforms the fat percentage Rf and a body thickness T of the subject H into a body thickness T1 in a standard soft part. The second derivation unit 44 calculates the bone density of the subject H by performing the correction according to the fat percentage Rf. The fat percentage application unit 45 applies the derived fat percentage Rf of the subject H to another radiation image of the same subject H.

The scattered ray removal unit 40 performs the scattered ray removal processing of removing the scattered ray component included in the first radiation image G1 and the second radiation image G2 acquired by the image acquisition unit 30. In the scattered ray removal processing, the scattered ray component is estimated and removed for each pixel of the radiation image according to the body thickness which is the estimated or measured thickness of the subject. Hereinafter, the scattered ray removal processing in the first radiation image G1 will be described. It should be noted that the second radiation image G2 is also subjected to the scattered ray removal processing in the same manner as in the first radiation image G1. In the following description, G1 and G2 will be used as reference numerals for the first and second radiation images from which the scattered ray components are removed.

First, the scattered ray removal unit 40 acquires an initial body thickness distribution Ts(x, y) as the estimated or measured body thickness. The initial body thickness distribution Ts(x, y) can be estimated from, for example, a virtual model of the subject H. The virtual model is data virtually representing the subject H of which the body thickness according to the initial body thickness distribution Ts(x, y) is associated with a coordinate position of each pixel of the first radiation image G1. It should be noted that the virtual model of the subject H having the initial body thickness distribution Ts(x, y) is stored in the storage memory 35 in advance, but the virtual model may be acquired from an external server. It should be noted that x and y are the coordinates of each pixel in the image.

In a case in which the virtual model is used, the scattered ray removal unit 40 derives an estimation primary ray image in which a primary ray image obtained by imaging the virtual model is estimated, and an estimation scattered ray image in which a scattered ray image obtained by imaging the virtual model is estimated, and combines an estimation image in which the first radiation image G1 is estimated.

Next, the scattered ray removal unit 40 performs the derivation of the scattered ray component Is(x, y) and the update of the body thickness distribution T(x, y) based on a difference between the estimation image and the first radiation image G1. For a detailed method, a known method need only be used. The scattered ray removal unit 40 subtracts the derived scattered ray component (x, y) from the first radiation image G1. As a result, the scattered ray component included in the first radiation image G1 is removed. In addition, the body thickness distribution T(x, y) after the update following the removal of the scattered ray component can be obtained and can be used as the body thickness T of the subject H.

The bone density can be derived with higher accuracy by performing the energy subtraction processing, which will be described below, by using the first and second radiation images G1 and G2 from which the scattered ray components are removed.

The image extraction unit 41 extracts the bone part image and the soft part image from the first radiation image G1 and the second radiation image G2 from which the scattered ray components are removed. By performing two times of emphasis processing of first emphasis processing and second emphasis processing, the bone part image in which the soft region is removed from the radiation image and the bone part is emphasized, and the soft part image in which the bone region is removed from the radiation image and the soft part is emphasized are obtained. The emphasis processing is processing of emphasizing a structure, an edge, or the like included in the radiation image by the image processing, and is the subtraction processing or the energy subtraction processing of removing a specific structure, noise, or the like from the radiation image. In addition, the body thickness T of the subject H may be measured from the radiation image from which the scattered rays are removed or an extracted soft part image Gs from which the scattered rays are removed, instead of the value obtained from the difference calculated in the scattered ray removal processing.

Figure 5:
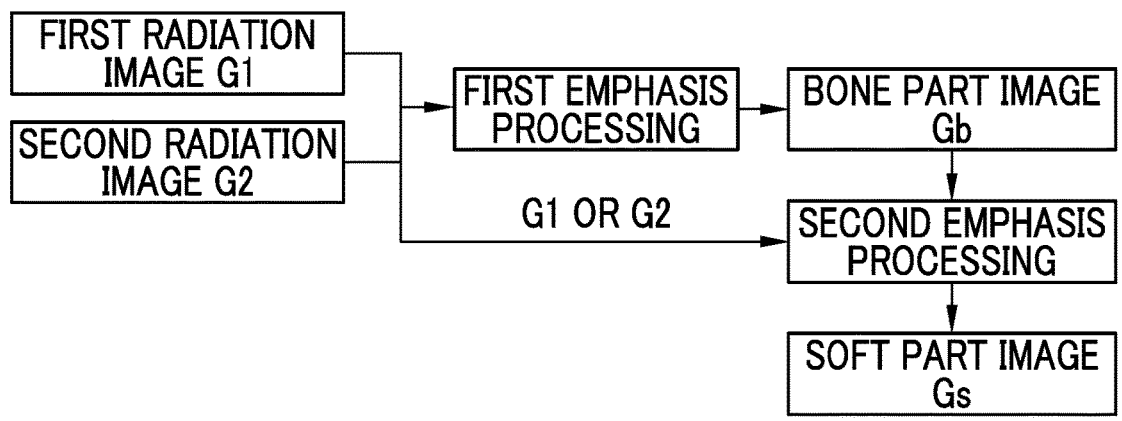
FIG. 5 is an explanatory diagram of first emphasis processing of extracting a bone part image, and second emphasis processing of extracting a soft part image by using the bone part image.

As shown in FIG. 5, for example, in the image extraction unit 41, the bone part image Gb is extracted from the first radiation image G1 and the second radiation image G2 by the first emphasis processing, and the soft part image Gs is extracted from the first radiation image G1 or the second radiation image G2 by using the bone part image Gb by the second emphasis processing. The radiation image as an extraction source of the soft part image Gs in the second emphasis processing may be either the first radiation image G1 or the second radiation image G2.

It is preferable that the first emphasis processing is energy subtraction processing (hereinafter, energy subtraction (ES) processing). In the present embodiment, the first radiation image G1 and the second radiation image G2, which are the two radiation images, are subjected to the ES processing according to an operation expression. In the ES processing, by a weighting operation in which one image of the two radiation images is weighted and subtracted from the other image, a signal caused by a specific tissue, such as the bone part or the soft part, in the processed image of operation processing or the like can be decreased according to a parameter, which is a weighting coefficient.

As the first emphasis processing, the bone part image Gb is extracted by the ES processing. It should be noted that the image generated by the ES processing is referred to as an ES image. The bone part image is the ES image. In the ES processing, the bone part image Gb is extracted as processing according to Expression (1) using two radiation images of the first radiation image G1 and the second radiation image G2. It should be noted that a1 is a weighting coefficient.

$$Gb(x,y)=G1(x,y)-\alpha1 \times G2(x,y) \quad (1)$$

In the second emphasis processing, it is preferable to extract the soft part image Gs by the subtraction processing. For the extraction of the soft part image Gs, processing of removing the bone region from the first radiation image G1 by using the bone part image Gb extracted in the first emphasis processing (see Expression (2)) or processing of removing the bone region from the second radiation image G2 by using the bone part image Gb (see Expression (3)) are executed. β1 and β2 are weighting coefficients, and are values independent of each other also including the weighting coefficient a1 in Expression (1).

$$Gs(x,y)=G1(x,y)-\beta1 \times Gb(x,y) \quad (2)$$

$$Gs(x,y)=G2(x,y)-\beta2 \times Gb(x,y) \quad (3)$$

In addition, the soft part image Gs may be extracted by the first emphasis processing which is the ES processing, and the bone part image Gb may be extracted by using the soft part image Gs in the second emphasis processing. In that case, the soft part image Gs in which the soft part of the subject H is extracted from the first and second radiation images G1 and G2 is generated by Expression (4), instead of Expression (1). In the extraction of the bone part image Gb by the second emphasis processing, the expression is used in which a relationship between the bone part image Gb and the soft part image Gs in Expression (2) and Expression (3) is reversed. In that case, the weighting coefficient is also a different value. α2 is a weighting coefficient.

$$Gs(x,y)=G1(x,y)-\alpha2 \times G2(x,y) \quad (4)$$

Figure 6:
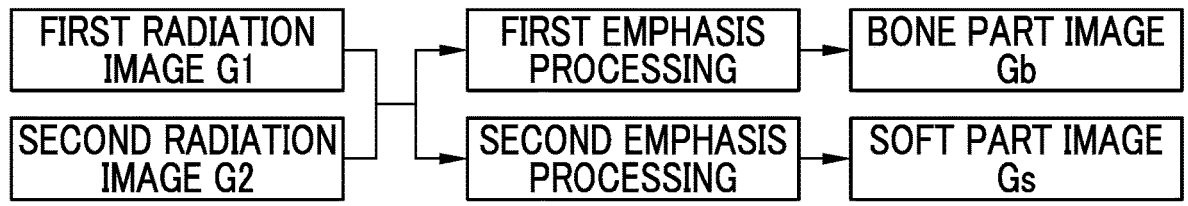
FIG. 6 is an explanatory diagram in which the extraction of the bone part image and the soft part image is performed by the first emphasis processing and the second emphasis processing, which are ES processing.

As shown in FIG. 6, a method may be used in which the ES processing is executed in both the first emphasis processing and the second emphasis processing to independently extract the bone part image Gb by the first emphasis processing and the soft part image Gs by the second emphasis processing by using the first radiation image G1 and the second radiation image G2. In that case, Expression (1) and Expression (4) are used individually. It should be noted that, in this case, it is not necessary to perform the first emphasis processing and the second emphasis processing in order. The processing may be executed simultaneously, or one emphasis processing may be interrupted and the other emphasis processing may be executed.

Figure 7:
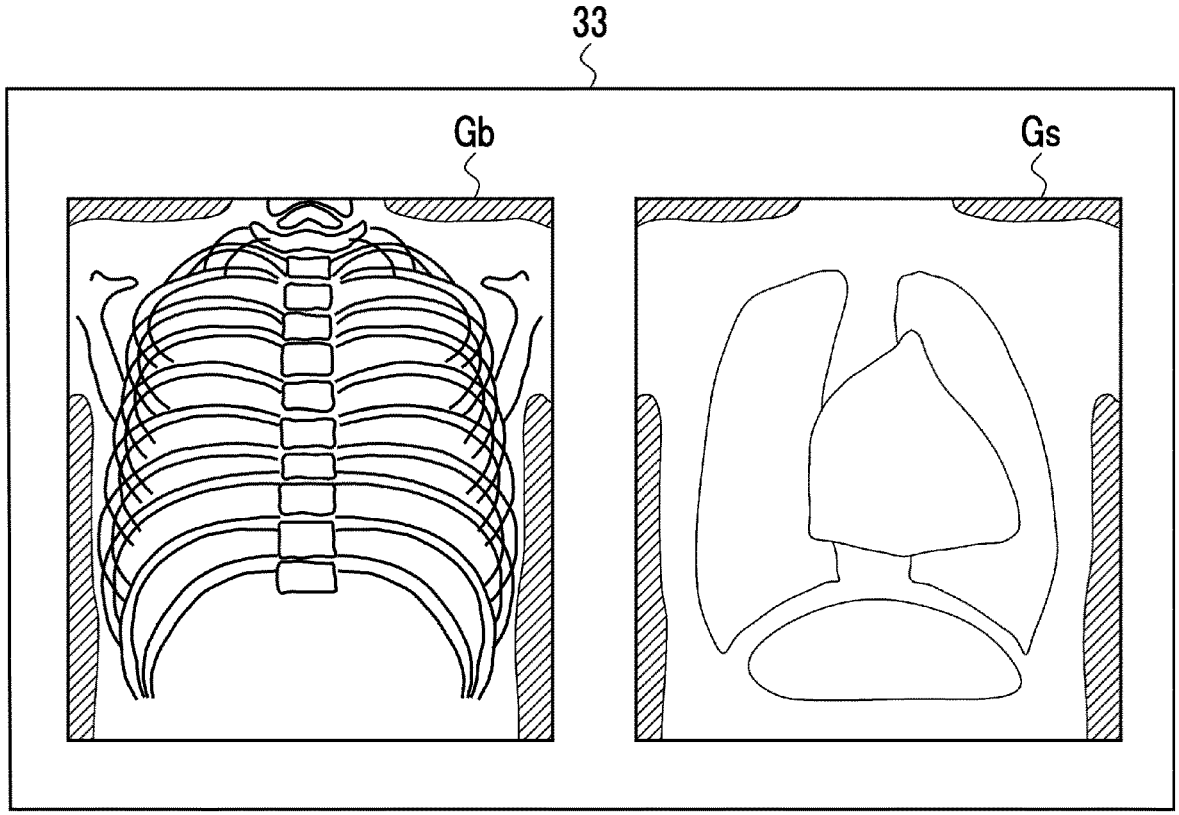
FIG. 7 is a schematic view of the bone part image and a schematic view of the soft part image in a chest of a subject displayed on a display 33.

As shown in FIG. 7, it is preferable to display the bone part image Gb and the soft part image Gs extracted by the first emphasis processing and the second emphasis processing on the display 33. The imaging person (or the operator) can check the bone part image Gb and soft part image Gs, which are extracted. The bone part image Gb and the soft part image Gs may be displayed simultaneously with the termination of the second emphasis processing, or the extracted image may be displayed first at the termination of the first emphasis processing. It should be noted that the ES processing may be started over according to the check result. In a case of start-over, it is preferable to change the setting or method in the extraction.

In the present embodiment, the bone density in the bone region of the subject H is calculated based on the bone part image Gb extracted by the ES processing. It should be noted that the pixel value (x, y) of the bone part image Gb are affected by the beam hardening, and the influence of the beam hardening is larger as the body thickness of the subject H is larger. In addition, even in a case in which the body thickness is the same, the influence of the beam hardening is larger as the fat percentage Rf in the soft region of the subject H is higher.

Figure 8:
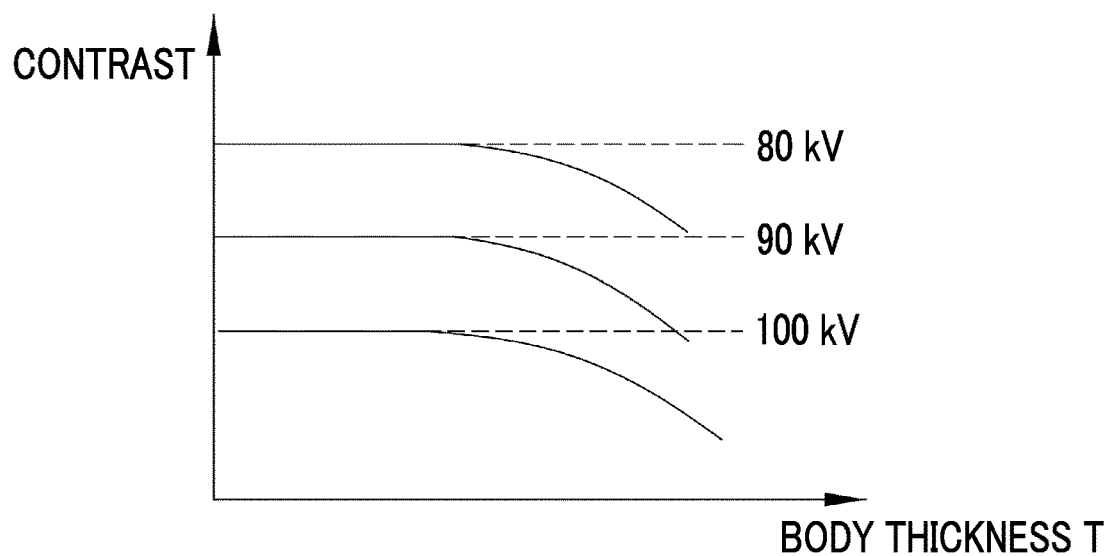
FIG. 8 is an explanatory diagram showing that a contrast between a bone part and a soft part in the same subject varies depending on a body thickness of the subject and a tube voltage of a radiation source.

As shown in FIG. 8, the contrast (that is, a difference between the pixel values) is lower as the tube voltage is higher. FIG. 8 is a diagram showing a relationship between the contrast between the bone region and the soft region and the body thickness of the subject H at three tube voltages of 80 kV, 90 kV, and 100 kV. As the tube voltage (kV value) in the radiation source 14 is higher and the energy of the emitted radiation Ra is higher, the lower energy component of the radiation Ra is absorbed by the subject H during the irradiation with the radiation Ra. Therefore, the energy of the detected radiation Ra is increased, and the contrast between the soft region and the bone region of the radiation image is decreased.

In addition, in a case in which the body thickness T of the subject H exceeds a certain value, the contrast is lower as the value of the body thickness T is larger. On the other hand, since a ratio of the radiation Ra having a relative low energy is higher in the transmitted radiation energy as the fat percentage Rf is higher, the contrast between the bone region and the soft region is clearer.

Figure 9:
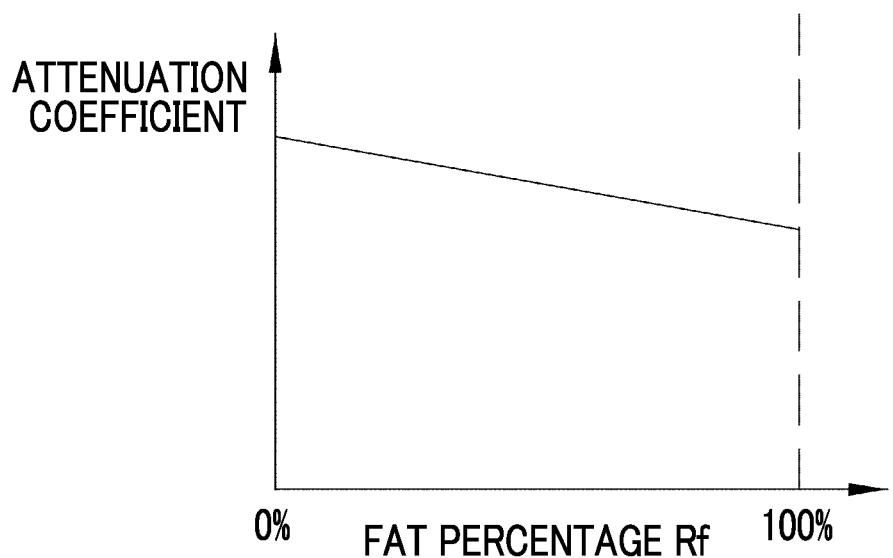
FIG. 9 is an explanatory diagram showing a relationship between an attenuation coefficient of the radiation and a fat percentage of the subject in a case in which the body thickness is constant.
Figure 10:
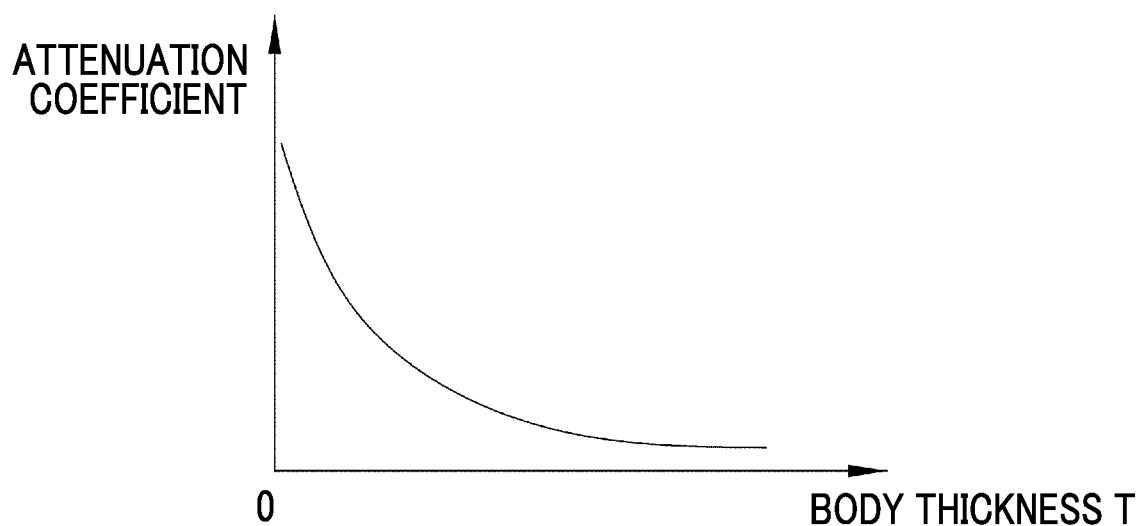
FIG. 10 is an explanatory diagram showing a relationship between the attenuation coefficient of the radiation and the body thickness of the subject in a case in which the fat percentage is constant.

As shown in FIG. 9, an attenuation coefficient of the radiation Ra used for the ES processing is monotonically decreased as the fat percentage Rf is increased in a case in which the body thickness is constant. In addition, as shown in FIG. 10, in a case in which the fat percentage is constant, the attenuation coefficient of the radiation Ra is decreased as the body thickness T is increased. Therefore, the attenuation coefficient of the soft tissue of the subject H depends on the fat percentage Rf and the body thickness T in the subject H, and the influence of the beam hardening of the radiation Ra is changed according to the fat percentage Rf and the body thickness T. Therefore, a correction coefficient for making the pixel value Gb(x, y) of the extracted bone part image smaller as the fat percentage Rf is higher is derived by using the fat percentage Rf, and the bone density is corrected.

In addition, the bone density is derived by correcting a value corresponding to the body thickness T of the subject by using a phantom. The fat percentage Rf of the substance corresponding to the soft tissue in the phantom is a constant value. Therefore, in a case in which the pixel value Gb(x, y) of the bone part image Gb is only corrected according to the body thickness T, the bone density different from the actual bone density is derived depending on the magnitude of the calculated original fat percentage Rf.

However, the calculation of the bone density by performing the correction according to the fat percentage and the correction according to the body thickness causes a large load of operation. Therefore, the bone density corrected for the influences of the body thickness T and the fat percentage Rf of the subject H is derived without directly using the fat percentage Rf. The fat percentage Rf and the body thickness T of the subject H are transformed into the body thickness T1 of the standard soft part in which the fat percentage is constant by the transformation unit 43, and the bone density of the subject H corrected by using the body thickness T1 of the standard soft part is derived by the second derivation unit 44.

The standard soft part is a soft part that has an attenuation coefficient and the fat percentage or the muscle percentage that correspond to the standard soft part of the human body. A phantom that simulates the human body and includes a substance corresponding to the standard soft part of the human body can be applied as the standard soft part. Acrylic, urethane, or the like can be applied as the substance corresponding to the standard soft part of the human body. It should be noted that the correction coefficient for correcting the pixel value Gb(x, y) of the bone part image Gb to the bone density can be derived by using the radiation image of the phantom obtained from the substance corresponding to the standard soft part and having various thicknesses. The attenuation coefficient of the radiation and the fat percentage Rf in the phantom are predetermined values according to the substance corresponding to the soft tissue.

The first derivation unit 42 obtains the fat percentage Rf in the entire image, that is, an average fat percentage Rf of each pixel of the soft part image Gs. The fat percentage Rf means a ratio of the fat occupied in the soft tissue of the human body. In a case in which the fat percentage of each pixel (x, y) is calculated, local variation occurs due to noise or the like. Therefore, as shown in Expression (5), the average fat percentage Rf in the entire image is calculated by using a fat thickness tf(x, y) occupied in the body thickness T of the subject H. The fat thickness tf(x, y) for each pixel is calculated from the body thickness distribution T(x, y) and the fat percentage Rf(x, y) of the subject H of the corresponding pixel, and the muscle thickness tm(x, y) for each pixel is calculated from the body thickness distribution T(x, y) and a muscle percentage Rm(x, y) of the subject H of the corresponding pixel. It should be noted that the body thickness T can be treated as a total of the fat thickness tf and the muscle thickness tm.

$$Rf = \Sigma(tf(x,y))/\Sigma(tm(x,y)+tf(x,y)) \quad (5)$$

In the present embodiment, a muscle tissue is derived by approximating a non-fat tissue. The soft tissue of the human body includes the muscle tissue, a fat tissue, an internal organ, blood, and water. Since the muscle tissue, the internal organ, the blood, and the water have similar radiation absorption characteristics, the non-fat tissue also including the internal organ, the blood, and the water in the muscle tissue can be treated as the muscle tissue. That is, in a case in which one of the fat percentage Rf(x, y) or the muscle percentage Rm(x, y) for each pixel can be derived, the other thereof can also be derived. Therefore, the ratios of the muscle and the fat in the soft tissue refers to the fat percentage or the muscle percentage.

The transformation unit 43 refers to a first look-up table LUT1 and acquires a body thickness transformation coefficient K corresponding to the fat percentage Rf of the entire image derived by the first derivation unit 42. By using the acquired body thickness transformation coefficient K, the fat percentage Rf and the body thickness T of the entire image of the subject H are transformed into the body thickness T1 of the standard soft part in which the transmission dose of the radiation Ra is equal and the fat percentage is constant. The transformed body thickness T1 of the standard soft part is transmitted to the second derivation unit 44.

Figure 11:
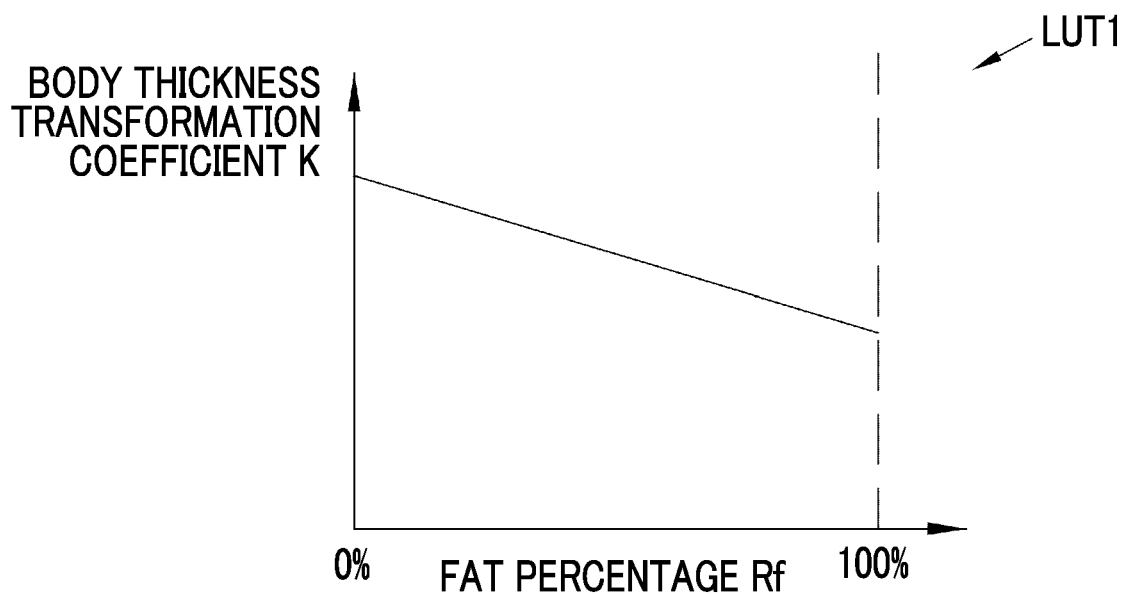
FIG. 11 is an explanatory diagram of a first look-up table for deriving a body thickness transformation coefficient for transforming the body thickness of the subject into a body thickness of a standard soft part based on the fat percentage.

As shown in FIG. 11, the body thickness transformation coefficient K, which is according to the fat percentage Rf in the soft part image Gs, for transforming the body thickness T of the subject H into the body thickness T1 of the standard soft part in which the fat percentage is constant is acquired by using the first look-up table LUT1. The value of the body thickness transformation coefficient K is smaller as the fat percentage Rf is lower. The first look-up table LUT1 is stored in the storage memory 35 in advance, and the transformation unit 43 refers to the first look-up table LUT1 according to the acquisition of the fat percentage Rf from the first derivation unit 42.

Since the attenuation coefficient is smaller as the body thickness of the subject is larger, so that the contrast between the bone region and the soft region is smaller. Even in a case in which the actual bone density is the same, the value of the bone density derived from the radiation image is smaller as the body thickness T of the subject is larger. In a second look-up table LUT2, the pixel value Gb(x, y) of the bone region according to the body thickness T1 is derived from the radiation image acquired by imaging the phantom having various thicknesses in advance, and the correction coefficient according to the body thickness T1 is derived such that the derived pixel value has the same bone density. In addition, the correction coefficient is derived according to various tube voltages.

The second derivation unit 44 refers to the second look-up table LUT2 and calculates a correction coefficient C of the bone density corresponding to the body thickness T1 of the standard soft part transformed by the transformation unit 43. By using the correction coefficient C, the bone density corrected for the fat percentage Rf and the body thickness T of the subject H is derived from the bone part image Gb. The derived bone density of the subject H is stored in the storage memory 35, and is displayed on the display 33 together with the bone part image Gb.

Figure 12:
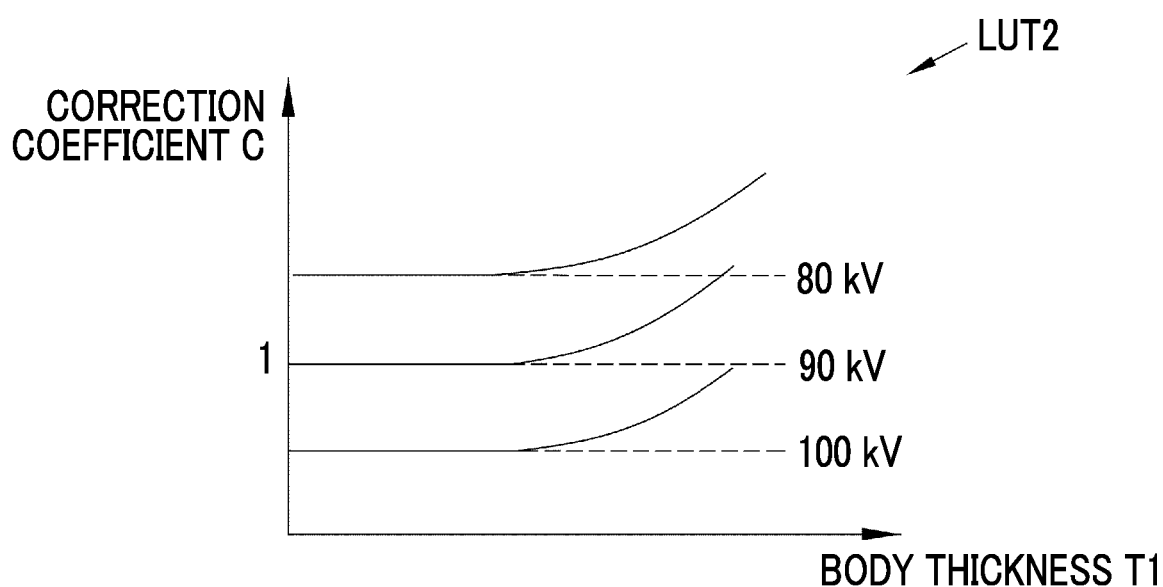
FIG. 12 is an explanatory diagram of a second look-up table for deriving a correction coefficient of a bone density based on the body thickness of the standard soft part in which the fat percentage is constant.

As shown in FIG. 12, the second look-up table LUT2 acquires the correction coefficient C for correcting a difference in the contrast of the bone part image Gb according to the tube voltage during the imaging and a decrease in the contrast due to the influence of the beam hardening. The second look-up table LUT2 maintains a relationship between the correction coefficient C of the bone density B and the body thickness T1 of the standard soft part for each pixel according to the imaging condition including the set value of the tube voltage. The value of the correction coefficient C is larger as the tube voltage is larger and the body thickness of the subject is larger. The second look-up table LUT2 is stored in the storage memory 35 in advance, and the second derivation unit 44 refers to the second look-up table LUT2 according to the acquisition of the body thickness T1 of the standard soft part from the transformation unit 43.

FIG. 12 shows a relationship between the body thickness and the correction coefficient in a case in which the tube voltages are set to 80 kV, 90 kV, and 100 kV, and as a standard imaging condition, the correction coefficient is 1 in a case in which the tube voltage is 90 kV and the body thickness is 0. In addition, the second look-up table LUT2 is shown in two dimensions, the correction coefficient C differs depending on the pixel value of the bone region. Therefore, the second look-up table LUT2 is actually a three-dimensional table to which an axis representing the pixel value of the bone region is added.

The second derivation unit 44 derives the bone density B in the bone region of the subject H based on the derived correction coefficient C and the generated bone part image Gb. As shown in Expression (6), each pixel value Gb(x, y) of the bone region in the bone part image Gb is multiplied by the correction coefficient C to derive the bone density B(x, y) for each pixel of the bone part image Gb. As a result, a bone density image having the bone density B(x, y) as the pixel value is derived. The bone density B(x, y) is a pixel value of the bone part of the bone region included in the radiation image from which the influence of the beam hardening is removed. It should be noted that, in the present embodiment, a unit of the bone density is g/cm². It is preferable to store the calculated bone density in association with the bone part image Gb or the radiation image.

$$B(x,y) = C \times Gb(x,y) \tag{6}$$

The second derivation unit 44 may derive a representative value of the bone density of a target part, and may display the derived representative value of the bone density. An average value, a median value, a maximum value, a minimum value, and the like of the bone density can be used as the representative value. Therefore, similar to the embodiment described above in which the fat percentage is used, the correction coefficient C corresponding to the derived body thickness T1(x, y) can be derived to derive the bone density B(x, y) by Expression (6).

Further, in the present embodiment, the bone density is derived based on the bone part image Gb and the fat percentage Rf. However, the bone density may be corrected by using the muscle percentage Rm instead of the fat percentage Rf. In order to derive the non-fat tissue in an approximate manner to the muscle tissue, it is possible to derive the muscle percentage Rm(x, y) by Expression (7) from the fat percentage Rf(x, y). The muscle percentage Rm(x, y) is an example of a muscle percentage distribution according to the present disclosure.

$$Rm(x,y) = 1 - Rf(x,y) \tag{7}$$

It should be noted that, in a case in which the body thickness T is constant, a relationship between the muscle percentage Rm and the attenuation coefficient is monotonically increased. Therefore, a relationship between the muscle percentage Rm and the body thickness transformation coefficient K is also monotonically increased. Therefore, the relationship between the muscle percentage Rm and the body thickness transformation coefficient K can be derived and stored in the storage memory 35, and the body thickness transformation coefficient K according to the muscle percentage Rm can be derived by referring to this relationship to transform the body thickness T of the subject H into the body thickness T1 of the standard soft part by using the derived body thickness transformation coefficient K.

The fat percentage application unit 45 provides the fat percentage Rf of the entire image of the radiation image calculated by the ES processing to the other radiation image in which the same subject H is imaged. Since the fat percentage of the same person is the same, the fat percentage obtained from the frontal view can be applied to the other radiation image of the same subject H. The other image of the radiation image may be the radiation image of the frontal view captured at a different timing, but includes a radiation image in which the subject H is imaged in the side view or the oblique view which is a different direction from the frontal view.

Figure 13:
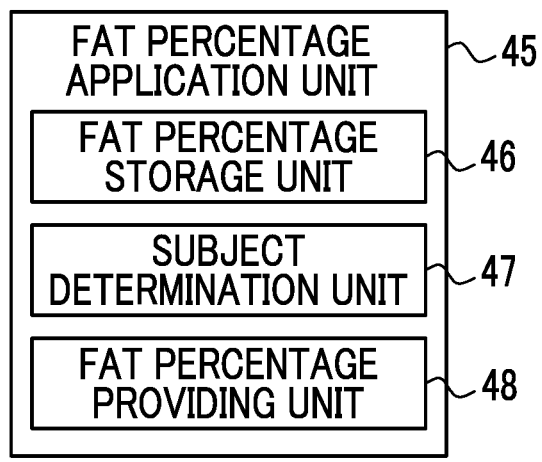
FIG. 13 is a block diagram showing a function realized by a fat percentage application unit in the radiation image processing apparatus.

As shown in FIG. 13, the fat percentage application unit 45 has functions of a fat percentage storage unit 46, a subject determination unit 47, and a fat percentage providing unit 48. By applying the fat percentage Rf to the other radiation image, it is possible to shorten the operation and the time for calculating the fat percentage Rf in the subtraction processing. It should be noted that the fat percentage Rf may be calculated from the side view or the oblique view in addition to the frontal view.

The fat percentage storage unit 46 stores the fat percentage of the derived radiation image together with information of the subject H. The fat percentage storage unit 46 may be provided with a storage region to store the fat percentage, or may realize a function of writing and reading data to and from the storage memory 35.

The subject determination unit 47 determines whether or not the subject H in the acquired radiation image has the same fat percentage as the stored fat percentage of the subject H. The determination is made by performing comparison of patient information or the imaging conditions input during the radiography and calculating a correlation between the radiation images. The determination does not include an imaging direction of the subject H. In a case in which it is determined that the radiation image is the radiation image in which the subject H having the same fat percentage as the stored fat percentage is imaged, a fat percentage providing instruction is transmitted to the fat percentage providing unit 48.

The fat percentage providing unit 48 applies the stored fat percentage to the acquired radiation image in response to the received fat percentage providing instruction. The fat percentage is transmitted to the first derivation unit 42, and is applied to the soft part image Gs before the calculation of the fat percentage. In the radiation image to which the fat percentage is applied, the applied fat percentage is used for the transformation into the body thickness of the standard soft part or the derivation of the bone density. It should be noted that the fat percentage providing instruction may be manually issued by a user, in addition to the subject determination unit 47.

Figure 14:
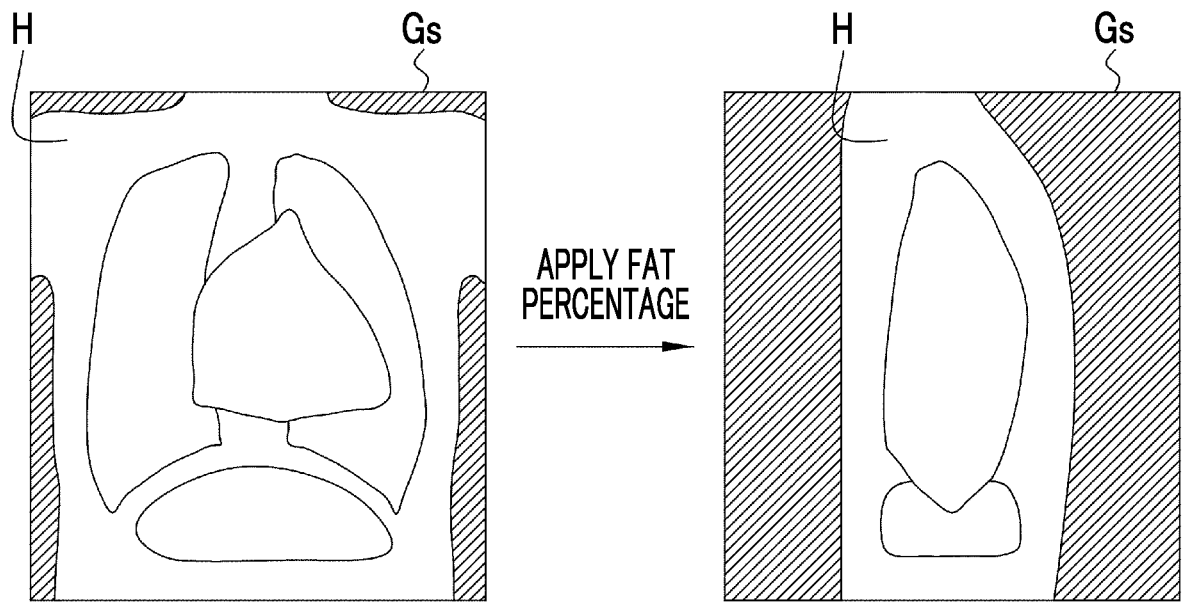
FIG. 14 is an explanatory diagram showing that the fat percentage calculated by energy subtraction processing is applied to another image of the same subject.

As shown in FIG. 14, for example, in two radiation images in which it is determined that a specific subject H is the same, even in a case in which the radiation image of a fat percentage derivation source is the frontal view and the radiation image of a fat percentage providing source is the side view, the fat percentage Rf can be applied. In addition, the fat percentage Rf may be applied between the radiation images of the subject H in the same direction, which are captured at different timings. Even in a case in which the subject H is imaged in different directions between the radiation images, a combination of the imaging directions is not particularly limited as long as it is determined that the subject H is the same.

By applying the fat percentage Rf of one radiation image to a different-direction image rather than obtaining the fat percentage Rf for each radiation image of the frontal view or the side view, it is possible to improve and stabilize the accuracy of the fat percentage Rf. For example, in a case in which the thickness of the frontal view is smaller than the thickness of the side view, an error of the frontal view is relatively small, so that the accuracy of the fat percentage Rf can be improved. In a case in which the fat percentage Rf is obtained in each of the frontal view and the side view, different errors are generated respectively, so that the stabilization can be achieved by applying the same fat percentage Rf.

The output controller 32 displays, for example, the bone density B estimated by the second derivation unit 44 on the display 33 together with the bone part image Gb. Alternatively, the bone density image (not shown) showing a bone density distribution in the radiation image of the subject H based on the derived bone density is displayed on the display 33. In the bone density image, a pattern may be given to the bone region according to the derived magnitude of the bone density.

As described above, in the present embodiment, the bone density in the bone region of the subject is derived based on the bone part image of the subject H and the fat percentage distribution. Therefore, since the derived bone density takes the fat percentage Rf into consideration, according to the present embodiment, the bone density can be derived with high accuracy.

In addition, in the present embodiment, as shown in FIG. 1, since the radiation image acquired by an imaging method (hereinafter, referred to as simple imaging) of irradiating the subject H with the radiation Ra to acquire a two-dimensional image which is the transmission image of the subject H is used, it is possible to easily derive the bone density. Therefore, the radiation image processing apparatus 12 according to the present embodiment can be applied to continuous use, such as medical check-up or treatment follow-up observation.

In addition, in the present embodiment, the radiation image processing system 10 including the radiography apparatus 11 and the radiation image processing apparatus 12 is described including the contents of the radiography, but a form may be adopted in which the radiation image processing apparatus 12 acquires the radiation image from an external storage device, such as the external server, instead of the radiography apparatus 11. In that case, the radiation image in which the same subject H is imaged, which can be subjected to the ES processing, is acquired together with the data, such as the imaging condition, from the external storage device, the fat percentage is derived, the image processing of applying the fat percentage to the radiation image in which the same subject H is imaged in a different direction.

In a case in which the radiation image is acquired from the external storage device, in a case of acquiring the two radiation images, the image acquisition unit 30 may acquire the radiation image subjected to various types of processing, such as scattered ray correction processing or other image processing, instead of a so-called original image. In addition, the image acquisition unit 30 may be configured to obtain the radiation image subjected to the scattered ray correction processing or the like as at least one of the two acquired radiation images.

Figure 15:
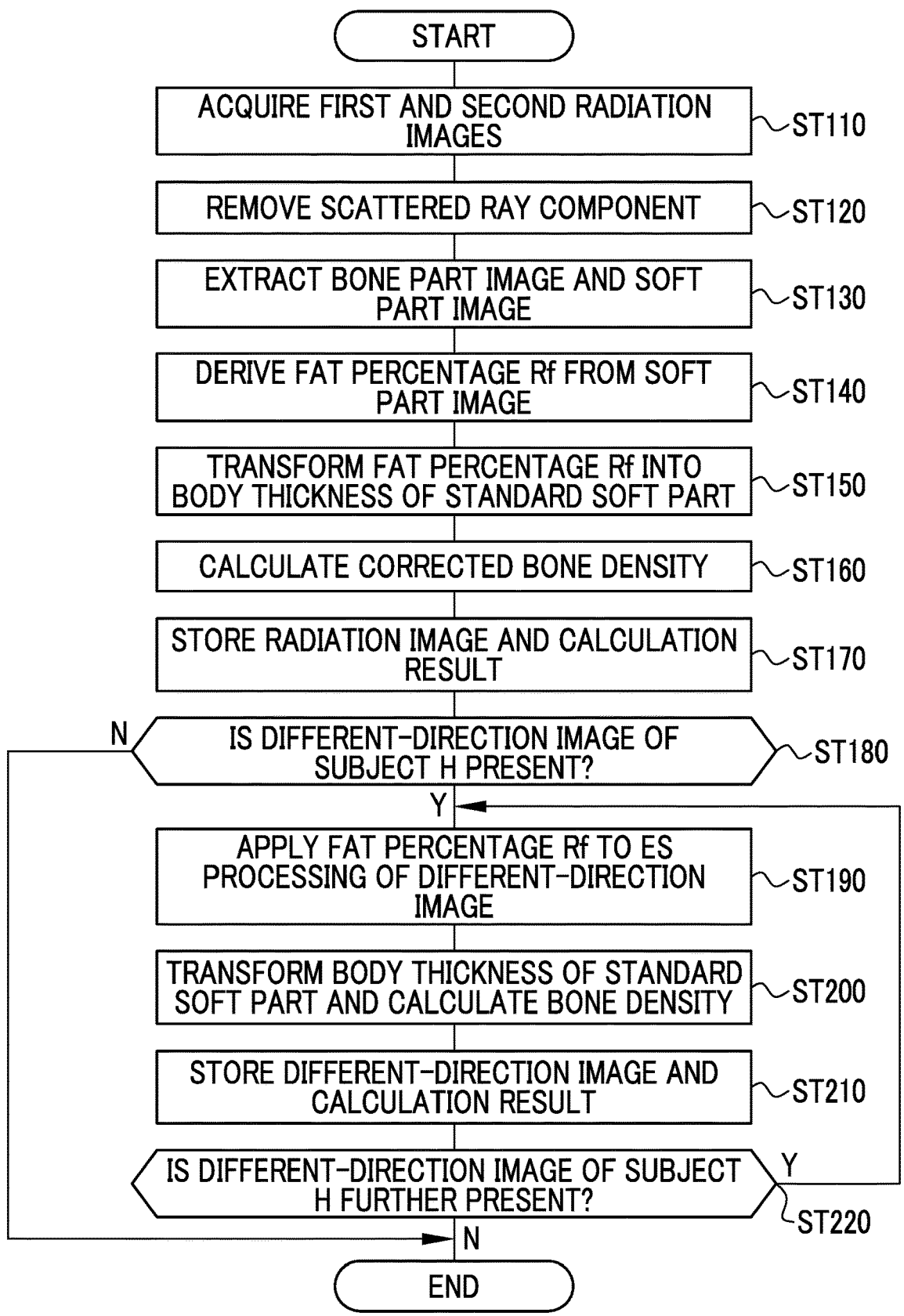
FIG. 15 is a flowchart showing the series of flows according to an embodiment of the present invention.

Hereinafter, an example of a flow of processing by the radiation image processing apparatus 12 according to the present invention will be described with reference to the flowchart shown in FIG. 15. The radiation image processing apparatus 12 acquires the first and second radiation images G1 and G2 in which the same subject H in the frontal view is imaged by using two types of radiation energies different from each other (step ST110). The scattered ray components are removed from the acquired first and second radiation images G1 and G2 by using the body thickness distribution T(x, y) measured or estimated in advance (step ST120). The ES processing is performed with respect to the first and second radiation images G1 and G2 from which the scattered ray components are removed, and the bone part image Gb in which the bone part of the subject H is extracted and the soft part image Gs in which the soft part of the subject H is extracted are extracted (step ST130). The fat percentage Rf of the subject H in the entire image is derived from the extracted soft part image Gs (step ST140). The first look-up table LUT1 is used to derive the body thickness transformation coefficient K according to the fat percentage Rf, and the body thickness transformation coefficient K is used to transform the body thickness T and the fat percentage Rf of the subject H into the body thickness T1 of the standard soft part (step ST150). The second look-up table LUT2 is used to acquire the correction coefficient C according to the body thickness T1 of the standard soft part, and the bone density of the subject H is derived (step ST160). The image, such as the bone part image Gb or the soft part image Gs, or the calculated value, such as the fat percentage Rf or the bone density, is stored (step ST170). In a case in which there is no image processing with respect to the radiation image obtained in which the subject H is imaged in a different direction (N in step ST180), the processing of the radiation image processing apparatus 12 is terminated.

In a case in which there is the image in which the same subject H is imaged in a direction different from the frontal view (Y in step ST180) by using two types of radiation energies different from each other, the stored fat percentage Rf is applied to the ES processing of the different-direction image, and the derivation of the fat percentage Rf is omitted (step ST190). By using the applied fat percentage Rf, the transformation of the body thickness and the calculation of the bone density in the different-direction image are performed (step ST200). The image, such as the bone part image Gb or the soft part image Gs, or the calculated value, such as the fat percentage Rf or the bone density, is stored (step ST210). Further, in a case in which there is the radiation image in which the same subject H is imaged in a different direction (Y in step ST220), the fat percentage Rf is applied to calculate the bone density in a case of further performing the ES processing (step ST190).

In a case in which there is no image processing with respect to the radiation image obtained in which the subject H is imaged in a different direction (N in step ST220), the processing of the radiation image processing apparatus 12 is terminated. The processing time in the ES processing can be shortened by applying the stored fat percentage Rf, and the calculation result, such as the bone density, can be stabilized by using the same fat percentage Rf.

In the present embodiment, the fat percentage Rf is applied to the different-direction image with respect to the radiation image in which the chest is imaged as the same subject H, but the present invention is not limited to this as long as the radiation image in which the same part of the same person is imaged is used. For example, the radiation image may be used in which a lumbar region in which the pelvis or the hip joint is captured, the vicinity of the joint of the femur, or the knee is imaged.

In addition, in the present embodiment, the first and second radiation images G1 and G2 are acquired by the one-shot method in a case in which the energy subtraction processing of deriving the bone density is performed, but the present invention is not limited to this. The first and second radiation images G1 and G2 may be acquired by a so-called two-shot method of performing the imaging twice by using only one radiation detector. In a case of the two-shot method, there is a possibility that a position of the subject H included in the first radiation image G1 and the second radiation image G2 shifts due to a body movement of the subject H. Therefore, in the first radiation image G1 and the second radiation image G2, it is preferable to perform the processing according to the present embodiment after the registration of the subject is performed.

Second Embodiment

In the first embodiment described above, the ES processing is executed with respect to the radiation image to acquire the fat percentage of the entire image, and the fat percentage Rf is applied to the radiation image in which the same subject H is imaged in a different direction. On the other hand, in the second embodiment, the fat percentage Rf, which is calculated by using the radiation image that is first captured among the radiation images that are continuously captured, is applied to the ES processing with respect to the radiation image captured thereafter. It should be noted that the description of the contents common to the embodiment described above will be omitted. It is preferable that the radiation images captured continuously are images captured in the same direction.

As in the first embodiment, the fat percentage Rf of one image is obtained for continuously captured images which are the radiation images continuously captured, and then the same fat percentage Rf is applied to the subsequent radiation images. The processing time can be shortened and stabilized by applying the fat percentage Rf to the radiation images that are continuously captured. It should be noted that the continuous imaging of the continuously captured images need only be generally imaging that is performed on the same day. In addition, the continuously captured images include a radiation video. For the radiation video as well, the fat percentage Rf may be derived for each frame, and one fat percentage Rf may be applied to each frame captured later in the same manner as in the continuously captured images.

Figure 16:
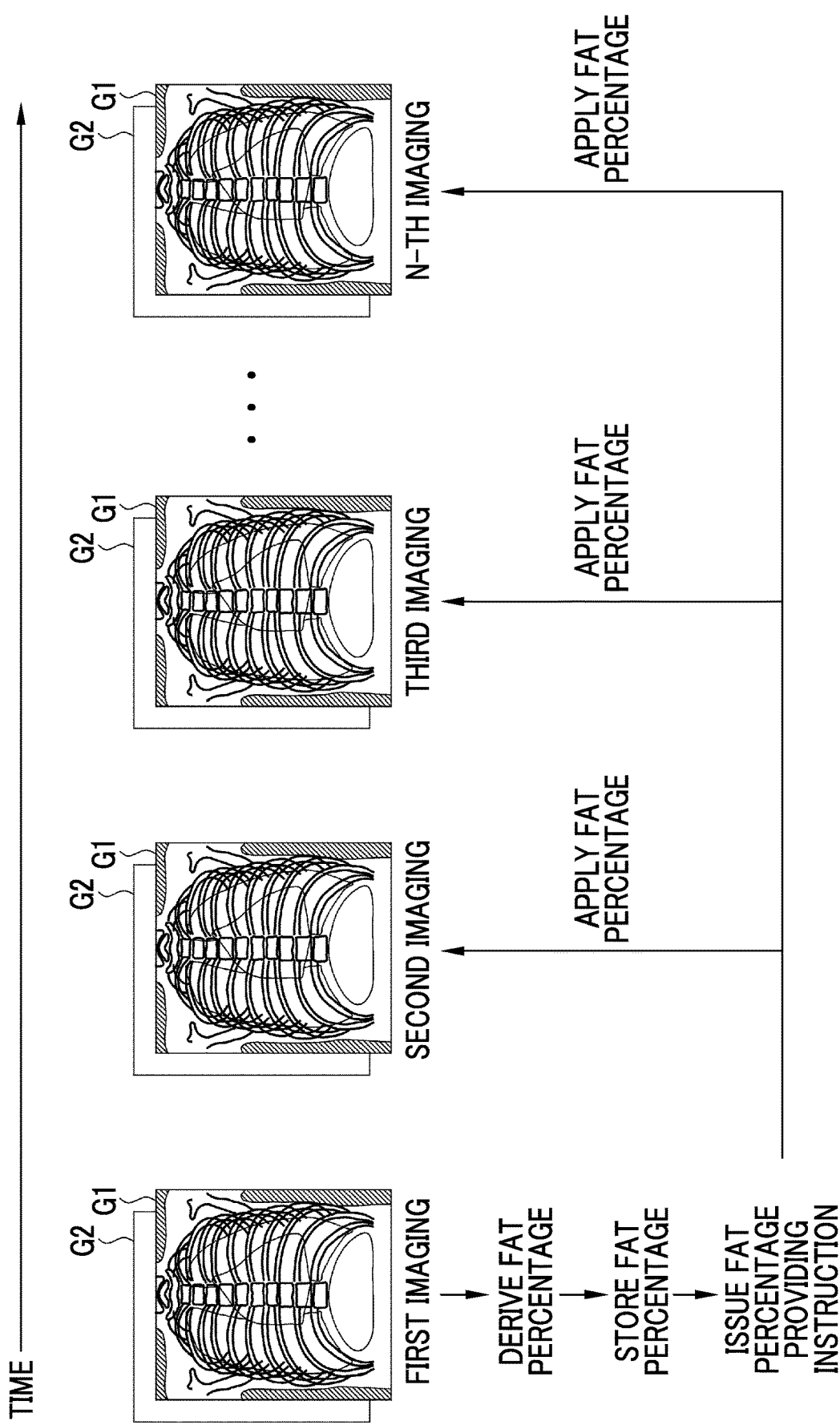
FIG. 16 is an explanatory diagram of a function of applying the fat percentage to continuously captured images realized in a second embodiment.

As shown in FIG. 16, in a case in which N times of the radiography are continuously performed on the frontal view of the same subject H, the fat percentage Rf is derived from the first and second radiation images G1 and G2 acquired in the first imaging, and is stored in the storage memory 35. The stored fat percentage Rf is applied to the radiation image of the second imaging, the radiation image of the third imaging, and up to the radiation image of N-th imaging. The specific subject H is continuously imaged in the same direction, and thus the determination by the subject determination unit 47 as to whether or not the subject H is the same may be omitted. In that case, it is preferable to issue a fat percentage application instruction at the start of capturing of the radiation image.

Third Embodiment

In the first embodiment and the second embodiment described above, the fat percentage Rf of the entire image acquired from the ES processing in the radiation image captured from one direction is applied to the radiation image in which the same subject H is imaged. On the other hand, in the third embodiment, an average value of the fat percentages Rf of the radiation images in which the subject H is imaged in a plurality of directions is stored, and is applied to the radiation image in which the specific subject H is determined to be the same. It should be noted that the description of the contents common to the first and second embodiments described above will be omitted.

In the third embodiment, the fat percentage Rf in each radiation image in which the specific subject H is imaged in the plurality of directions is derived, and the average value of the derived fat percentages Rf is calculated. A fat percentage average Rfa is calculated from two or more fat percentages Rf derived from the radiation images captured at different timings. It is preferable to use the fat percentage of the radiation images captured in two or more types of directions as the fat percentage average Rfa. In the calculation of the fat percentage average Rfa, a function of a fat percentage average calculation unit (not shown) is realized in the fat percentage application unit 45.

Figure 17:
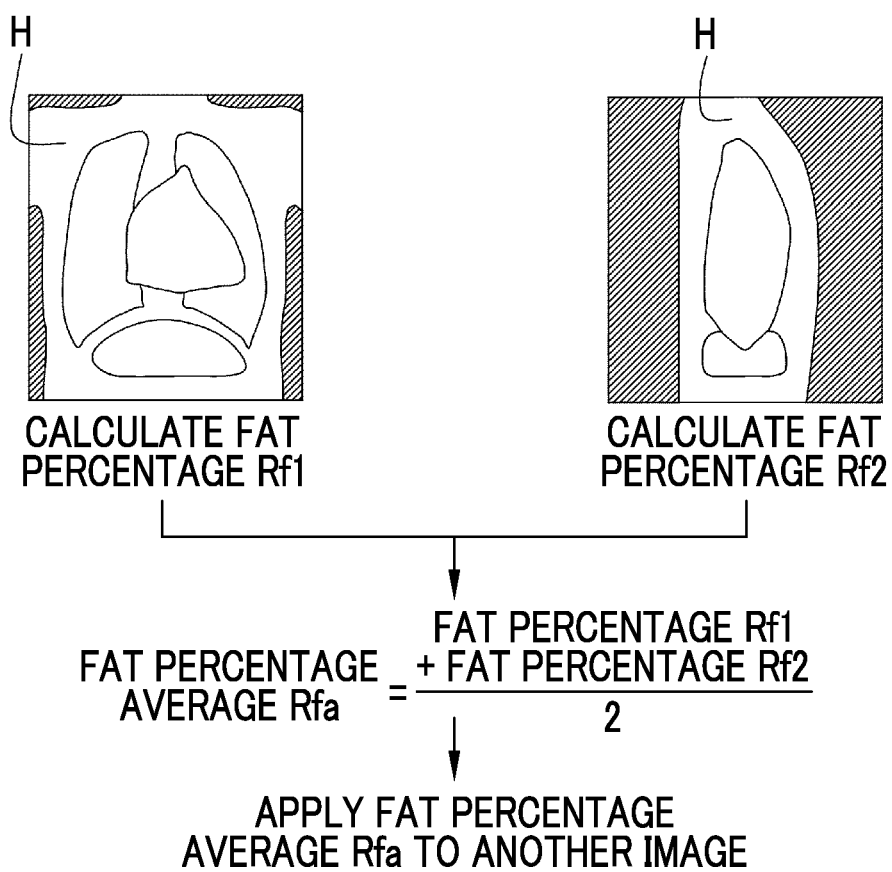
FIG. 17 is an explanatory diagram of a function of calculating a fat percentage average from a plurality of different radiation images of the same subject realized in a third embodiment.

As shown in FIG. 17, for example, in a case in which the fat percentage average Rfa is obtained from two fat percentages Rf, a first fat percentage Rf1 is derived from the radiation image in which the specific subject H is in the frontal view, and is transitorily stored in the fat percentage application unit 45. Similarly, a second fat percentage Rf2 is derived from the radiation image in which the specific subject H is in the side view, and is transitorily stored. The fat percentage average Rfa is calculated from the transitorily stored fat percentages Rf1 and Rf2, and is stored. The calculation of the bone density and the like are performed by applying the fat percentage average Rfa to the subsequent acquired radiation image of the same subject H.

As the imaging direction of the radiation image used for the calculation of the fat percentage average Rfa, in addition to the combination of the frontal view and the side view, there is a combination of any two including the oblique view, or a pattern using three or more types of the frontal view, the side view, and the oblique view. In addition, in a case in which the images have the oblique views and different angles, the oblique views are treated as the radiation images in different imaging directions. In a case in which the radiation images are captured n times in different imaging directions from each other, in the fat percentage average calculation unit, the fat percentage average Rfa is calculated by dividing the total of n fat percentages by n. By applying the fat percentage average Rfa using the fat percentage of the subject H in the plurality of directions, the accuracy of the fat percentage can be improved.

In addition, regarding the imaging direction, the side views may be distinguished into a right side view in which a right side surface is imaged and a left side view in which a left side surface is imaged, and the oblique view may be captured at any angle in the plurality of imaging directions. In order to distinguish the oblique views, for example, the oblique views may be distinguished into a first oblique view, a second oblique view, and a third oblique view in order from the angle closest to the right side view.

In the embodiments described above, a hardware structure of a processing unit that executes various types of processing, such as the image acquisition unit 30, the image processing unit 31, the output controller 32, and the input reception unit 34 in the radiation image processing apparatus 12, is various processors as described below. Examples of the various processors include a central processing unit (CPU), which is a general-purpose processor that executes software (program) to function as various processing units, a programmable logic device (PLD), which is a processor of which a circuit configuration can be changed after manufacturing, such as a field programmable gate array (FPGA), and a dedicated electric circuit, which is a processor of which a circuit configuration is designed exclusively for executing various types of processing.

One processing unit may be configured by using one of these various processors, or may be configured by using a combination of two or more same type or different type of processors (for example, a plurality of FPGAs, or a combination of a CPU and an FPGA). In addition, a plurality of the processing units may be configured by using one processor. As an example in which the plurality of processing units are configured by using one processor, first, there is a form in which one processor is configured by using a combination of one or more CPUs and software, and this processor functions as the plurality of processing units, as represented by a computer, such as a client or a server. Second, there is a form in which a processor, which implements the functions of the entire system including the plurality of processing units with one integrated circuit (IC) chip, is used, as represented by a system on chip (SoC) or the like. As described above, various processing units are configured by using one or more of the various processors described above, as the hardware structure.

Further, the hardware structure of these various processors is, more specifically, an electric circuit (circuitry) having a form in which circuit elements, such as semiconductor elements, are combined. In addition, the hardware structure of the storage unit is a storage device, such as a hard disc drive (HDD) or a solid state drive (SSD).

EXPLANATION OF REFERENCES

10: radiation image processing system
11: radiography apparatus
12: radiation image processing apparatus
14: radiation source
15: radiography panel
16: first radiation detector
17: radiation energy transformation filter
18: second radiation detector
19: console
20: display
21: operation unit
22: communication unit
30: image acquisition unit
31: image processing unit
32: output controller
33: display
34: input reception unit
35: storage memory
40: scattered ray removal unit
41: image extraction unit
42: first derivation unit
43: transformation unit
44: second derivation unit
45: fat percentage application unit
46: fat percentage storage unit
47: subject determination unit
48: fat percentage providing unit
C: correction coefficient
G1: first radiation image
G2: second radiation image
Gb: bone part image
Gs: soft part image
H: subject
K: body thickness transformation coefficient
LUT1: first look-up table
LUT2: second look-up table
Ra: radiation
Rf: fat percentage
Rf1: fat percentage
Rf2: fat percentage
Rfa: fat percentage average
T: body thickness
T1: body thickness

What is claimed is:

1. A radiation image processing apparatus comprising:
one or more processors configured to:
acquire at least two radiation images in which a plurality of radiation energies different from each other are used, respectively, for the same subject;
calculate a fat percentage occupied in a soft tissue of the subject by subtraction processing with respect to the two radiation images; and
apply the fat percentage to the subtraction processing with respect to another image that is a radiation image in which the subject is imaged at a different timing from the radiation image.

2. The radiation image processing apparatus according to claim 1,
wherein the one or more processors are configured to estimate and remove scattered rays according to a body thickness distribution for each pixel for the radiation image for which the subtraction processing is performed.

3. The radiation image processing apparatus according to claim 1,
wherein the one or more processors are configured to acquire, as the other image, a different-direction image in which the subject is imaged in a different direction from the radiation image.

4. The radiation image processing apparatus according to claim 1,
wherein the one or more processors are configured to correct a bone density of the subject, which is calculated from a bone part image of the radiation image extracted by the subtraction processing, by using the fat percentage.

5. The radiation image processing apparatus according to claim 4,
wherein the one or more processors are configured to:
transform the fat percentage into a body thickness of a standard soft part; and
calculate a correction coefficient in calculation of the bone density of the subject from the body thickness of the standard soft part.

6. The radiation image processing apparatus according to claim 1,
wherein the one or more processors are configured to calculate the fat percentage from an entire image of the radiation image.

7. The radiation image processing apparatus according to claim 6,
wherein the one or more processors are configured to:
extract a soft part image in the radiation image by the subtraction processing;
derive a muscle thickness and a fat thickness of the subject from the soft part image; and
calculate the fat percentage based on the fat thickness and the muscle thickness.

8. The radiation image processing apparatus according to claim 1,
wherein the one or more processors are configured to apply the fat percentage, which is calculated by using the radiation image that is first captured among the radiation images that are continuously captured, to the subtraction processing with respect to the radiation image captured thereafter.

9. The radiation image processing apparatus according to claim 8,
wherein the one or more processors are configured to apply the fat percentage to the subtraction processing with respect to a radiation video.

10. The radiation image processing apparatus according to claim 1,
wherein the one or more processors are configured to apply a fat percentage average, which is an average of two or more fat percentages calculated from the radiation images in which the subject is imaged at different timings, to the subtraction processing with respect to the radiation image.

11. The radiation image processing apparatus according to claim 10,
wherein the one or more processors are configured to calculate the fat percentage average from the fat percentages of the radiation images captured in any two types of directions different from each other among a frontal view, a side view, and an oblique view.

12. The radiation image processing apparatus according to claim 10,
wherein the one or more processors are configured to calculate the fat percentage average from the fat percentages of the radiation images captured in three or more types of directions different from each other among a frontal view, two types of side views, and a plurality of oblique views.

13. The radiation image processing apparatus according to claim 1,
wherein the one or more processors are configured to use a muscle percentage occupied in the soft tissue of the subject instead of the fat percentage.

14. An operation method of a radiation image processing apparatus, the method comprising:
a step of acquiring at least two radiation images in which a plurality of radiation energies different from each other are used, respectively, for the same subject;
a step of calculating a fat percentage occupied in a soft tissue of the subject by subtraction processing with respect to the two radiation images; and
a step of applying the fat percentage to the subtraction processing with respect to another image that is a radiation image in which the subject is imaged at a different timing from the radiation image.

15. A non-transitory computer readable medium for storing a computer-executable program for causing a computer to function as a radiation image processing apparatus, the computer-executable program causing the computer to execute:
a function of acquiring at least two radiation images in which a plurality of radiation energies different from each other are used, respectively, for the same subject;
a function of calculating a fat percentage occupied in a soft tissue of the subject by subtraction processing with respect to the two radiation images; and
a function of applying the fat percentage to the subtraction processing with respect to another image that is a radiation image in which the subject is imaged at a different timing from the radiation image.

* * * * *